United States Patent
Yao

(10) Patent No.: US 8,488,298 B2
(45) Date of Patent: Jul. 16, 2013

(54) DIELECTRIC CERAMIC AND LAMINATED CERAMIC CAPACITOR

(75) Inventor: Takayuki Yao, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 141 days.

(21) Appl. No.: 13/048,032

(22) Filed: Mar. 15, 2011

(65) Prior Publication Data

US 2011/0235235 A1    Sep. 29, 2011

(30) Foreign Application Priority Data

Mar. 24, 2010  (JP) .................................. 2010-067351

(51) Int. Cl.
*H01G 4/06* (2006.01)
*C04B 35/00* (2006.01)

(52) U.S. Cl.
USPC .................. 361/321.4; 361/321.1; 361/321.2; 361/321.3; 361/321.5; 501/134; 501/135; 501/136; 501/137

(58) Field of Classification Search
USPC ..... 501/134, 135, 136, 137; 361/321.1–321.5
See application file for complete search history.

(56) References Cited

U.S. PATENT DOCUMENTS

2009/0207551 A1   8/2009   Suzuki

FOREIGN PATENT DOCUMENTS

| JP | 10330160 A | 12/1998 |
| JP | 2007145649 A | 6/2007 |
| JP | 2009155118 A | 7/2009 |
| JP | 2009155118 A * | 7/2009 |
| JP | 2009-208979 A | 9/2009 |
| KR | 2006-0135304 A | 12/2006 |
| KR | 2007-0050090 A | 5/2007 |
| WO | WO-2008-068999 A1 | 6/2008 |

OTHER PUBLICATIONS

Japanese Office Action issued for corresponding application JP 2010-067351, dated Jul. 3, 2012 (with English translation).

* cited by examiner

*Primary Examiner* — Eric Thomas
*Assistant Examiner* — Arun Ramaswamy
(74) *Attorney, Agent, or Firm* — Dickstein Shapiro LLP

(57) ABSTRACT

A dielectric ceramic capacitor that has excellent reliability and particularly excellent life characteristics in a load test even when the thickness of a dielectric ceramic layer is reduced uses a dielectric ceramic as a dielectric ceramic layer in a laminated ceramic capacitor which is a substance containing, as the main component, $(Ba, R)(Ti, V)O_3$ or $(Ba, Ca, R)(Ti, V)O_3$ in which R is at least one selected from La, Ce, Pr, Nd, Sm, Eu, Gd, Tb, Dy, Ho, Er, Tm, Yb, Lu, and Y, and in which both V and R are present uniformly in the main component particles.

10 Claims, 1 Drawing Sheet

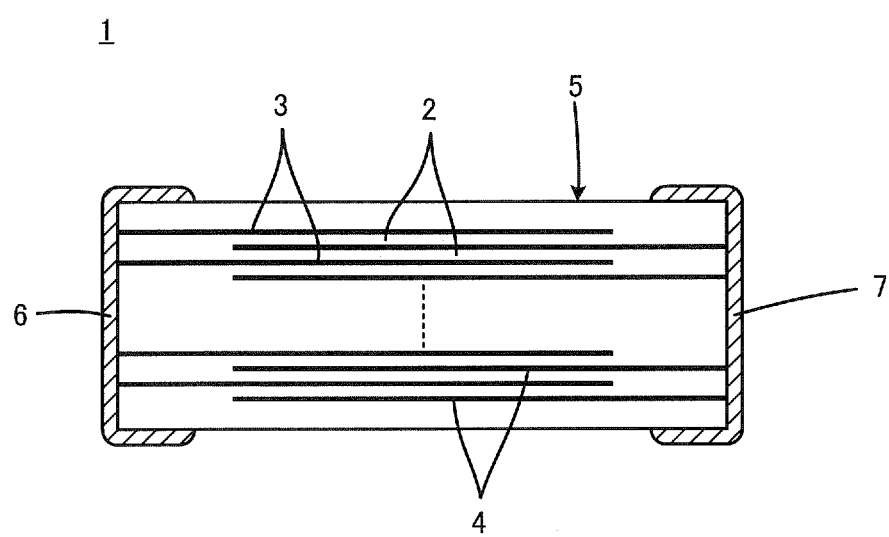

DIELECTRIC CERAMIC AND LAMINATED CERAMIC CAPACITOR

BACKGROUND OF THE INVENTION

1. Field of the Invention

The present invention relates to a dielectric ceramic and a laminated ceramic capacitor, and particularly relates to a dielectric ceramic suitable for use in a thin layer, large capacity, laminated ceramic capacitor and a laminated ceramic capacitor constituted using the dielectric ceramic.

2. Description of the Related Art

Mentioned as one of effective measures for satisfying demands for a reduction in the size and an increase in the capacity of a laminated ceramic capacitor is to reduce the thickness of the dielectric ceramic layers provided in the laminated ceramic capacitor. However, the electric field strength per layer of the dielectric ceramic layer becomes higher with the reduction in the thickness of the dielectric ceramic layer. Therefore, the dielectric ceramic used has been required to have more reliability, and particularly higher life characteristics in a load test.

As the dielectric ceramic constituting the dielectric ceramic layer of the laminated ceramic capacitor, a $BaTiO_3$ dielectric ceramic has been used in many cases. In the $BaTiO_3$ dielectric ceramic, elements, such as rare earth elements or Mn, are added as accessory components in order to achieve favorable reliability and various electrical characteristics.

For example, Japanese Unexamined Patent Application Publication No. 10-330160 (Patent Document 1) discloses a dielectric ceramic having a core shell structure containing, as the main component, $ABO_3$ (A always contains Ba and sometimes contains at least one of Ca and Sr. B always contains Ti and sometimes contains at least one of Zr, Sc, Y, Gd, Dy, Ho, Er, Yb, Tb, Tm, and Lu.), in which at least one of Mn, V, Cr, Co, Ni, Fr, Nb, Mo, Ta, and W is almost uniformly dispersed throughout the particles. Patent Document 1 also discloses an Example in which Mg is a shell component and the Mg is not dispersed in the core and is dispersed only in the shell portion.

However, even when the dielectric ceramic described in Patent Document 1 is used, the reliability and particularly the life characteristics in a load test are insufficient when there is a further reduction in the thickness of the dielectric ceramic layer, and thus a further improvement has been demanded.

SUMMARY OF THE INVENTION

Accordingly, it is an object of the present invention is to provide a dielectric ceramic capable of realizing high reliability even when the thickness of a dielectric ceramic layer is further reduced and a laminated ceramic capacitor constituted using the dielectric ceramic.

According to preferred embodiments of the present invention, a dielectric ceramic contains, as the main component, $(Ba, R)(Ti, V)O_3$ or $(Ba, Ca, R)(Ti, V)O_3$ where R is at least one selected from La, Ce, Pr, Nd, Sm, Eu, Gd, Tb, Dy, Ho, Er, Tm, Yb, Lu, and Y. In the dielectric ceramic according to preferred embodiments of the invention, both V and R are present uniformly in the main component particles.

It is preferable in the dielectric ceramic according to preferred embodiment of the invention, that the R content be about 0.01 to about 2% by mol in the entire (Ba, R) or (Ba, Ca, R) site.

The V content is preferably about 0.01 to about 1% by mol in the entire (Ti, V) site.

The Ca content is preferably about 0.01 to about 15% by mol in the entire (Ba, Ca, R) site.

The invention is also directed to a laminated ceramic capacitor having a capacitor main body constituted by two or more laminated dielectric ceramic layers and two or more internal electrodes formed along specific interfaces between the dielectric ceramic layers and two or more external electrodes that are formed at different positions on the outer surface of the capacitor main body and electrically connected to a specific internal electrode.

In the laminated ceramic capacitor according to preferred embodiments of the invention, the dielectric ceramic layer contains the above-described dielectric ceramic.

According to the dielectric ceramic according to preferred embodiments of the invention, a reduction in the oxygen vacancy concentration or the movement of oxygen vacancies can be suppressed without reducing the insulation properties in the main component particles by uniformly forming a solid solution of each of R and B in as the main component particles while maintaining the charge balance.

Therefore, when a laminated ceramic capacitor is constituted using the dielectric ceramic according to preferred embodiments of the invention, high reliability and particularly favorable life characteristics in a load test can be realized even when the thickness of the dielectric ceramic layer is reduced.

In the dielectric ceramic according to preferred embodiments of the invention, when the R content is selected to be about 0.01 to about 2% by mol in the entire (Ba, R) or (Ba, Ca, R) site, more favorable life characteristics can be achieved.

When the V content is selected to be about 0.01 to about 1% by mol in the entire (Ti, V) site, more favorable life characteristics can be achieved.

When the Ca content is selected to be about 0.01 to about 15% by mol in the entire (Ba, Ca, R) site, more favorable life characteristics can be achieved.

Other features, elements, characteristics and advantages of the present invention will become more apparent from the following detailed description of preferred embodiments of the present invention with reference to the attached drawing.

BRIEF DESCRIPTION OF THE DRAWING

FIG. 1 is a cross sectional view schematically showing a laminated ceramic capacitor 1 constituted using a dielectric ceramic according to preferred embodiments of the invention.

DESCRIPTION OF THE PREFERRED EMBODIMENTS

With reference to FIG. 1, a laminated ceramic capacitor 1 to which a dielectric ceramic according to preferred embodiments of the invention is applied will be described first.

The laminated ceramic capacitor 1 has a capacitor main body 5 constituted by two or more laminated dielectric ceramic layers 2 and two or more internal electrodes 3 and 4 formed along specific interfaces between the dielectric ceramic layers 2. The internal electrodes 3 and 4 contain, for example, Ni as the main component.

At different positions on the outer surface of the capacitor main body 5, first and second external electrodes 6 and 7 are formed. The external electrodes 6 and 7 contain, for example, Ag or Cu as the main component. In the laminated ceramic capacitor 1 shown in FIG. 1, the first and second external electrodes 6 and 7 are formed on each of the end surfaces, which face each other, of the capacitor main body 5. The internal electrodes 3 and 4 include two or more first internal electrodes 3 electrically connected to the first external electrode 6 and two or more second internal electrodes 4 electrically connected to the second external electrode 7. The first and second internal electrodes 3 and 4 are alternately disposed as viewed in the lamination direction.

The laminated ceramic capacitor 1 may be a two terminal type having two external electrodes 6 and 7 or may be a multi-terminal type having a large number of external electrodes.

In such a laminated ceramic capacitor 1, the dielectric ceramic layers 2 are constituted by a dielectric ceramic containing, as the main component, (Ba, R)(Ti V)$O_3$ or (Ba, Ca, R)(Ti, V)$O_3$ where R is at least one selected from La, Ce, Pr, Nd, Sm, Eu, Gd, Tb, Dy, Ho, Er, Tm, Yb, Lu, and Y. Here, it should be noted that both R and V uniformly form solid solutions in the main component particles while maintaining the charge balance.

Thus, by uniformly forming solid solutions of R and V in the main component particles, a reduction in the oxygen vacancy concentration or the movement of oxygen vacancies can be suppressed without reducing the insulation properties of the main component particles. Therefore, when the laminated ceramic capacitor 1 is constituted using the dielectric ceramic, high reliability, and particularly favorable life characteristic in a load test can be realized even when the thickness of the dielectric ceramic layer 2 is reduced.

When the R content is about 0.01 to about 2% by mol in the entire (Ba, R) or (Ba, Ca, R) site, the life characteristics can be further improved.

When the V content is about 0.01 to about 1% by mol in the entire (Ti, V) site, the life characteristics can be further improved.

In the above-describe dielectric ceramic, when the main component is (Ba, Ca, R)(Ti, V)$O_3$, i.e., when a solid solution of Ca is formed in the Ba site, higher reliability is obtained compared with the case where the main component is (Ba, R)(Ti, V)$O_3$. When the Ca content is about 0.01 to about 15% by mol in the entire (Ba, Ca, R) site, the life characteristics can be further improved.

In producing raw materials for the dielectric ceramic, a main component powder of (Ba, R)(Ti, V)$O_3$ or (Ba, Ca, R)(Ti, V)$O_3$ is first produced. Therefore, for example, a solid phase synthesis method including mixing compound powders of oxides, carbonates, chlorides, organic metal compounds, and the like, containing the constituent elements of the main component with a given mixing ratio, and then firing the mixture, is applied. In such a case, the particle size of the obtained main component powder is controlled by adjusting the firing temperature, for example. In place of the above-described solid phase synthesis method, a hydrothermal crystallization method, a hydrolysis method, or the like may be employed.

Separately, compound powders of oxides, carbonates, chlorides, and organic metal compounds containing, for example, each of Mn and Si, are prepared as an accessory component as required. Then, by mixing the accessory component powders with the above-described main component powder with a given ratio, a raw material powder for the dielectric ceramic is obtained.

In order to manufacture the laminated ceramic capacitor 1, a ceramic slurry is produced using the dielectric ceramic raw material powder obtained as described above. Then, ceramic green sheets are molded from the ceramic slurry, and a conductive paste for forming internal electrodes are applied to some of the sheets. By laminating two or more of the ceramic green sheets having the conductive paste thereon, a raw laminate to serve as the capacitor main body 5 is obtained. Then, a process for firing the raw laminate is carried out. In the process for firing the raw laminate, the dielectric ceramic raw material powder blended as described above is fired to thereby obtain the dielectric ceramic layer 2 containing a sintered dielectric ceramic.

Hereinafter, Examples carried out based on the invention will be described.

Example 1

In Example 1, the case where the main component contains (Ba, R)(Ti, V)$O_3$ and the case where the main component contains (Ba, R)Ti$O_3$ and Ba(Ti, V)$O_3$ were compared.

(A) Production of Ceramic Materials

First, powders of $Dy_2O_3$, $V_2O_5$, $BaCO_3$, $TiO_2$, and $R_2O_3$ were prepared as a starting material of the main component. Then, each powder was weighed so that the composition in the main component particles was $(Ba_{0.99}Dy_{0.01})TiO_3$ in sample 101, $Ba(Ti_{0.995}V_{0.005})O_3$ in sample 102, and $(Ba_{0.99}Dy_{0.01})(Ti_{0.995}V_{0.005})O_3$ in sample 103, as shown in the column of "Composition in main component particles" of Table 1, and then the powders were mixed for about 8 hours in a ball mill using water as a medium. Thereafter, the mixture was evaporated and dried, and then fired at about 1100° C. for about 2 hours, thereby obtaining a main component powder of each of the samples 101 to 103.

Next, powders of $MnCO_3$ and $SiO_2$ as accessory components were prepared. The powders of $MnCO_3$ and $SiO_2$ each were weighed so that Mn was about 0.25 part by mol and Si was about 1.5 parts by mol based on about 100 parts by mol of the main component, blended in the main component powders, and then mixed in a ball mill for about 24 hours using water as a medium. Thereafter, the mixture was evaporated dried, thereby obtaining dielectric ceramic raw material powder of each of the samples 101 to 103.

(B) Production of Laminated Ceramic Capacitor

By adding a polyvinyl butyral binder and ethanol to the ceramic raw material powder, and performing wet mixing for about 16 hours in a ball mill, a ceramic slurry was produced.

Next, the ceramic slurry was molded into a substantially sheet shape by a ripping method, thereby obtaining a ceramic green sheet.

Next, a conductive paste mainly containing Ni was screen-printed onto the ceramic green sheet to thereby form a conductive paste film serving as an internal electrode.

Next, two or more of the ceramic green sheets on which the conductive paste film was formed were laminated so that the side to which the conductive paste film extended are alternately laminated, thereby obtaining a raw laminate serving as a capacitor main body.

Next, the raw laminate was heated to a temperature of about 300° C. in an $N_2$ atmosphere to burn out the binder. Thereafter, the resultant laminate was fired at a temperature of about 1200° C. for about 2 hours in a reduction atmosphere having an oxygen partial pressure of $10^{-10}$ MPa and containing $H_2$—$N_2$—$H_2O$ gas, thereby obtaining a sintered capacitor main body.

Next, a Cu paste containing a $B_2O_3$—$Li_2O$—$SiO_2$—$BaO$ glass frit was applied to both end surfaces of the capacitor main body after sintering, and baked at a temperature of about 800° C. in an $N_2$ atmosphere to form external electrodes electrically connected to internal electrodes, thereby obtaining a laminated ceramic capacitor samples.

The outside dimensions of the laminated ceramic capacitor thus obtained were about 2.0 mm in length, about 1.2 mm in width, and about 1.0 mm in thickness, and the thickness of the dielectric ceramic layer interposed between the internal electrodes was about 1.0 μm. The number of effective dielectric ceramic layers was about 100 and the facing area of the internal electrodes per ceramic layer was about 1.4 mm².

(C) Evaluation of Properties

The obtained laminated ceramic capacitor was subjected to a high temperature load life test. In the high temperature load life test, a direct current voltage (electric field strength of about 12 kV/mm) of about 12 V was applied to about 100 units of each sample at a temperature of about 125° C. Samples in which the insulation resistance value was about 100 kΩ or lower when about 1000 hours had passed were judged to be defective, and the number of the defects was determined. The results are shown in the column of the "Number of defects in high temperature load life test" of Table 1.

TABLE 1

| Sample No. | Composition of main component particles | Number of defects in high temperature load life test 1000 hours |
|---|---|---|
| 101 | $(Ba_{0.99}Dy_{0.01})TiO_3$ | 3/100 |
| 102 | $Ba(Ti_{0.995}V_{0.005})O_3$ | 3/100 |
| 103 | $(Ba_{0.99}Dy_{0.01})(Ti_{0.995}V_{0.005})O_3$ | 0/100 |

As shown in Table 1, no defects occurred in the high temperature load life test in the sample 103 in which the composition of the main component particles is $(Ba_{0.99}Dy_{0.01})(Ti_{0.995}N_{0.005})O_3$, and excellent reliability was exhibited as compared with the samples 101 and 102. This is presumed to be caused by the fact that solid solutions of both Dy and V were uniformly formed in the main component particles in the sample 103.

Example 2

In Example 2, a dielectric ceramic was evaluated in which the main component was $(Ba, R)(Ti, V)O_3$, similar to sample 103 of Example 1 but the amount of V and the amount of R were changed.

(A) Production of Ceramic Raw Materials

A dielectric ceramic raw material powder was obtained in the same manner as in Example 1, except that the composition of the main component powder was $(Ba_{1-x/100}Dy_{x/100})(Ti_{1-y/100}V_{y/100})O_3$ using Dy as R, and the content "x" of Dy as R in the (Ba, R) site and the content "y" of V in the (Ti, V) site were adjusted to have values shown in the column of "x" and "y" of Table 2, respectively.

(B) Production of Laminated Ceramic Capacitor

A laminated ceramic capacitor of each sample was produced using the dielectric ceramic raw material powder in the same manner as in Example 1.

(C) Evaluation of Properties

A high temperature load life test was carried out in the same manner as in Example 1. The results are shown in the column of a "Number of defects in high temperature load life test" of Table 2.

TABLE 2

| Sample No. | X | y | Number of defects in high temperature load life test 1000 hours |
|---|---|---|---|
| 201 | 1.40 | 0.35 | 0/100 |
| 202 | 0.30 | 0.60 | 0/100 |

TABLE 2-continued

| Sample No. | X | y | Number of defects in high temperature load life test 1000 hours |
|---|---|---|---|
| 203 | 1.90 | 0.60 | 0/100 |
| 204 | 0.01 | 1.00 | 0/100 |
| 205 | 2.00 | 1.20 | 1/100 |
| 206 | 2.10 | 0.50 | 1/100 |
| 207 | 1.50 | 0.01 | 0/100 |
| 208 | 0.90 | 1.00 | 0/100 |
| 209 | 0.60 | 1.10 | 1/100 |
| 210 | 2.40 | 1.30 | 1/100 |

As shown in Table 2, all of samples 201 to 210 exhibited favorable reliability. Particularly in samples 201 to 204, 207, and 208 in which the "x", which is the Dy content in the main component particles, was in the range of about 0.01 to about 2, and the "y", which is the V content, was in the range of about 0.01 to about 1, no defects occurred in the high temperature load life test, and a more favorable reliability was exhibited.

In contrast, the reliability was somewhat poor in the sample 206. This is presumed to be caused by the fact that the Dy content "x" in the main component particles exceeded about 2, and thus the charge balance was broken.

Also in the samples 205 and 209, the reliability was somewhat poor. This is presumed to be caused by the fact that the V content "y" in the main component particles exceeded about 1.

Reliability was somewhat poor also in the sample 210. This is presumed to be caused by the fact that the Dy content "x" in the main component particles exceeded about 2 and the V content "y" also exceeded about 1, and thus the dispersibility of the additional ingredients Dy and V in the main component particles varied.

The results show that when the "x", which is the R content, is in the range of about 0.01 to about 2 and the "y", which is the V content, is in the range of about 0.01 to about 1, higher reliability can be obtained.

Example 3

In Example 3, laminated ceramic capacitors of each sample were produced in the same manner as in Example 1, replacing Dy as R with the elements shown in the column of the "R species" of Table 3 in the composition in the main component particles of the sample 103 in Example 1, and a high temperature load life test was similarly carried out. In Example 3, the number of defects was determined for samples in which the insulation resistance value was about 100 kΩ or lower when not only at about 1000 hours but also when about 2000 hours passed in the high temperature load life test.

TABLE 3

| Sample No. | R species | Number of defects in high temperature load life test 1000 hours | 2000 hours |
|---|---|---|---|
| 301 | La | 0/100 | 0/100 |
| 302 | Gd | 0/100 | 0/100 |
| 303 | Eu | 0/100 | 0/100 |
| 304 | Ho | 0/100 | 0/100 |
| 305 | Er | 0/100 | 0/100 |
| 306 | Yb | 0/100 | 0/100 |
| 307 | Y | 0/100 | 0/100 |

As shown in Table 3, all of samples 301 to 307 exhibited excellent reliability.

Example 4

Example 4 corresponds to Example 1 where the main component was (Ba, R)(Ti, V)O$_3$ except that in Example 4, the main component was (Ba, Ca, R)(Ti, V)O$_3$.

(A) Production of Ceramic Raw Materials

First, as starting materials of the main component, powders of each of fine particle BaCO$_3$, CaCO$_3$, TiO$_2$, Gd$_2$O$_3$, and V$_2$O$_5$ was prepared. Then, each powder was weighed so that, as shown in the column of "Composition in main component particles" of Table 4, sample 401 has a composition of (Ba$_{0.98}$Ca$_{0.01}$Gd$_{0.01}$)TiO$_3$, sample 402 has a composition of (Ba$_{0.99}$Ca$_{0.01}$)(Ti$_{0.995}$V$_{0.005}$)O$_3$, and sample 403 has a composition of (Ba$_{0.98}$Ca$_{0.01}$Gd$_{0.01}$)(Ti$_{0.995}$V$_{0.005}$)O$_3$, and then mixed for about 8 hours in a ball mill using water as a medium. Thereafter, the mixture was evaporated and dried, and fired at a temperature of about 1100° C. for about 2 hours, thereby obtaining a main component powder.

Next, powders of each of MnCO$_3$ and SiO$_2$ serving as an accessory component were prepared. Then, the powder of MnCO$_3$ and the powder of SiO$_2$ were weighed so that Mn was about 0.25 part by mol and Si was about 1.5 parts by mol based on about 100 parts by mol of the main component, blended in the main component powder, and mixed for about 24 hours in a ball mill using water as a medium. Thereafter, the mixture was evaporated and dried, thereby obtaining a dielectric ceramic raw material powder.

(B) Production of Laminated Ceramic Capacitor

A ceramic slurry was produced by adding a polyvinyl butyral binder and ethanol to the ceramic raw material powder, and wet mixing for about 16 hours in a ball mill.

Thereafter, the same process as in Example 1 was carried out, thereby obtaining a laminated ceramic capacitor serving as a sample.

(C) Evaluation of Properties

The obtained laminated ceramic capacitor was subjected to a high temperature load life test in the same manner as in Example 1. In Example 4, the capacitor was evaluated not only in the case when about 1000 hours passed but when about 2000 hours passed. The results are shown in the column of the "Number of defects in high temperature load life test" of Table 4.

TABLE 4

| Sample No. | Composition in main component particles | Number of defects in high temperature load life test | |
|---|---|---|---|
| | | 1000 hours | 2000 hours |
| 401 | (Ba$_{0.98}$Ca$_{0.01}$Gd$_{0.01}$)TiO$_3$ | 3/100 | 5/100 |
| 402 | (Ba$_{0.99}$Dy$_{0.01}$) (Ti$_{0.995}$V$_{0.005}$)O$_3$ | 3/100 | 5/100 |
| 403 | (Ba$_{0.98}$Ca$_{0.01}$Gd$_{0.01}$) (Ti$_{0.995}$V$_{0.005}$)O$_3$ | 0/100 | 0/100 |

As shown in Table 4, no defects occurred in the sample 403 in which the composition of the main component particles is (Ba$_{0.98}$Ca$_{0.01}$Gd$_{0.01}$)(Ti$_{0.995}$V$_{0.005}$)O$_3$, not only in the case where about 1000 hours passed but in the case where about 2000 hours passed in the high temperature load life test, and excellent reliability was exhibited as compared with the samples 401 and 402. This is presumed to be caused by the fact that solid solutions of both Dy and V were uniformly formed in the main component particles in the sample 403.

Example 5

In Example 5, a dielectric ceramic was evaluated in which the main component was (Ba, Ca, R)(Ti, V)O$_3$, similar to Example 4, but the Ca amount, the R amount, and the V amount were changed.

(A) Production of Ceramic Raw Materials

A dielectric ceramic raw material powder was obtained in the same manner as in Example 4, except that the composition of the main component powder was (Ba$_{1-x-y/100}$Ca$_{x/100}$Gd$_{y/100}$)(Ti$_{1-z/100}$V$_{z/100}$)O$_3$ and the content "x" of Ca and the content "y" of Gd as R in the (Ba, Ca, R) site were adjusted to have values shown in the column of "x" and "y" of Table 5, respectively, and the content z of V in the (Ti, V)O$_3$ site was adjusted to have a value represented in the column of "z" of Table 5.

(B) Production of Laminated Ceramic Capacitor

A laminated ceramic capacitor of each sample was produced in the same manner as in Example 4 using the dielectric ceramic raw material powder.

(C) Evaluation of Properties

A high temperature load life test was carried out in the same manner as in Example 4. The results are shown in the column of the "Number of defects in high temperature load life test" of Table 5.

TABLE 5

| Sample No. | x | y | z | Number of defects in high temperature load life test | |
|---|---|---|---|---|---|
| | | | | 1000 hours | 2000 hours |
| 501 | 1.00 | 1.50 | 0.50 | 0/100 | 0/100 |
| 502 | 4.30 | 0.20 | 0.70 | 0/100 | 0/100 |
| 503 | 7.90 | 1.90 | 0.64 | 0/100 | 0/100 |
| 504 | 0.01 | 0.70 | 0.90 | 0/100 | 0/100 |
| 505 | 15.00 | 0.90 | 0.70 | 0/100 | 0/100 |
| 506 | 17.00 | 1.90 | 0.50 | 1/100 | 2/100 |
| 507 | 2.10 | 0.01 | 0.21 | 0/100 | 0/100 |
| 508 | 1.50 | 2.00 | 0.35 | 0/100 | 0/100 |
| 509 | 3.40 | 2.20 | 0.55 | 1/100 | 2/100 |
| 510 | 5.90 | 1.50 | 0.01 | 0/100 | 0/100 |
| 511 | 14.10 | 0.70 | 1.00 | 0/100 | 0/100 |
| 512 | 0.60 | 0.60 | 1.10 | 0/100 | 2/100 |
| 513 | 16.00 | 2.40 | 1.30 | 1/100 | 2/100 |

As shown in Table 5, all of samples 501 to 513 exhibited favorable reliability. Particularly in samples 501 to 505, 507, 508, 510, and 511 in which the "x", which is the Ca content, is in the range of about 0.01 to about 15, the "y", which is the content amount of Gd as R, is in the range of about 0.01 to about 2, and the "z", which is the V content, is in the range of about 0.01 to about 1, no defects occurred not only in the case when about 1000 hours passed but in the case when about 2000 hours passed in the high temperature load life test.

In sample 506 in which the "x", which is the Ca content, exceeded about 15, in sample 509 in which the "y", which is the content of Gd as R, exceeded about 2, in sample 513 in which the "x", which is the Ca content, exceeded about 15, and the "z" which is the V content exceeded about 1, slight defects occurred when about 1000 hours passed and when about 2000 hours passed in the high temperature load life test.

No defects occurred in the sample 512 in which the "z", which is the V content, exceeded about 1, when about 1000 hours passed but slight defects occurred when about 2000 hours passed in the high temperature load life test.

The results show that when the "x", which is the Ca content, is in the range of about 0.01 to about 15, the "y", which is the R content, is in the range of about 0.01 to about 2, and the "z", which is the V content, is in the range of about 0.01 to about 1, higher reliability can be obtained.

Example 6

Example 6 corresponds to Example 3 with a different R.

In Example 6, a laminated ceramic capacitor of each sample was produced in the same manner as in Example 4, replacing Gd as R with elements shown in the column of the "R species" of Table 6 in the composition in the main component particles of the sample 403 in Example 4, and a high temperature load life test was similarly carried out.

TABLE 6

| Sample No. | R species | Number of defects in high temperature load life test | |
|---|---|---|---|
| | | 1000 hours | 2000 hours |
| 601 | Ce | 0/100 | 0/100 |
| 602 | Pr | 0/100 | 0/100 |
| 603 | Nd | 0/100 | 0/100 |
| 604 | Sm | 0/100 | 0/100 |
| 605 | Tm | 0/100 | 0/100 |
| 606 | Tb | 0/100 | 0/100 |
| 607 | Lu | 0/100 | 0/100 |

As shown in Table 6, all of samples 501 to 513 exhibited favorable reliability.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A dielectric ceramic, comprising, as the main component, $(Ba, R)(Ti, V)O_3$, in which R is at least one member of the group selected from the group consisting of La, Ce, Pr, Nd, Sm, Eu, Gd, Tb, Dy, Ho, Er, Tm, Yb, Lu, and Y, wherein the R content is about 0.01 to about 2% by mol of the (Ba, R) site, and wherein the V content is about 0.01 to about 1% by mol of the (Ti, V) site, and wherein there is no Ca in the (Ba, R) site.

2. A dielectric ceramic, comprising, as the main component, $(Ba, R)(Ti, V)O_3$ optionally containing Ca in the (Ba, R) site, in which R is at least one member of the group selected from the group consisting of La, Ce, Pr, Nd, Sm, Eu, Gd, Tb, Dy, Ho, Er, Tm, Yb, Lu, and Y, wherein the R content is about 0.3 to about 1.9% by mol of the (Ba, R) site, and the V content is about 0.35 to about 0.9% by mol of the (Ti, V) site.

3. The dielectric ceramic according to claim 2, the Ca content is about 0.6 to about 14.1% by mol of the (Ba, R) site.

4. A dielectric ceramic, comprising, as the main component, $(Ba, R)(Ti, V)O_3$ optionally containing Ca in the (Ba, R) site, in which R is at least one member of the group selected from the group consisting of La, Ce, Pr, Nd, Sm, Eu, Gd, Tb, Dy, Ho, Er, Tm, Yb, Lu, and Y, wherein Ca is present and the Ca content is about 0.6 to about 14.1% by mol of the (Ba, R) site.

5. A laminated ceramic capacitor, comprising:
a capacitor main body constituted by two or more laminated dielectric ceramic layers and two or more internal electrodes disposed at different interfaces between dielectric ceramic layers; and
two external electrodes disposed at different positions on an outer surface of the capacitor main body and electrically connected to different internal electrodes, in which the dielectric ceramic layers comprise the dielectric ceramic according to claim 4.

6. A laminated ceramic capacitor, comprising:
a capacitor main body constituted by two or more laminated dielectric ceramic layers and two or more internal electrodes disposed at different interfaces between dielectric ceramic layers; and
two external electrodes disposed at different positions on an outer surface of the capacitor main body and electrically connected to different internal electrodes, in which the dielectric ceramic layers comprise the dielectric ceramic according to claim 2.

7. A laminated ceramic capacitor, comprising:
a capacitor main body constituted by two or more laminated dielectric ceramic layers and two or more internal electrodes disposed at different interfaces between dielectric ceramic layers; and
two external electrodes disposed at different positions on an outer surface of the capacitor main body and electrically connected to different internal electrodes, in which the dielectric ceramic layers comprise the dielectric ceramic according to claim 3.

8. A laminated ceramic capacitor, comprising:
a capacitor main body constituted by two or more laminated dielectric ceramic layers and two or more internal electrodes disposed at different interfaces between dielectric ceramic layers; and
two external electrodes disposed at different positions on an outer surface of the capacitor main body and electrically connected to different internal electrodes, in which the dielectric ceramic layers comprise the dielectric ceramic according to claim 1.

9. The dielectric ceramic according to claim 1, wherein the R content is about 0.3 to about 1.9% by mol and the V content is about 0.35 to about 0.9% by mol of the (Ti, V) site.

10. A laminated ceramic capacitor, comprising:
a capacitor main body constituted by two or more laminated dielectric ceramic layers and two or more internal electrodes disposed at different interfaces between dielectric ceramic layers; and
two external electrodes disposed at different positions on an outer surface of the capacitor main body and electrically connected to different internal electrodes, in which the dielectric ceramic layers comprise the dielectric ceramic according to claim 9.

* * * * *